United States Patent [19]

Schneider et al.

[11] 4,330,810

[45] May 18, 1982

[54] SAFETY SWITCHING DEVICE

[75] Inventors: Franz Schneider; Helmut Braitinger, both of Göppingen, Fed. Rep. of Germany

[73] Assignee: L. Schuler GmbH, Göppingen, Fed. Rep. of Germany

[21] Appl. No.: 141,571

[22] Filed: Apr. 18, 1980

[30] Foreign Application Priority Data

Apr. 18, 1979 [DE] Fed. Rep. of Germany ....... 2915589

[51] Int. Cl.³ .......................................... H01H 47/00
[52] U.S. Cl. ................................................... 361/189
[58] Field of Search ................ 361/189, 190, 139, 191

[56] References Cited

U.S. PATENT DOCUMENTS 2,545,549  3/1951  Guill et al. ......................... 361/189

FOREIGN PATENT DOCUMENTS 2208816  9/1973  Fed. Rep. of Germany ...... 361/189
2442470  6/1980  France ................................ 361/189

*Primary Examiner*—Harry E. Moose, Jr.
*Attorney, Agent, or Firm*—Craig and Antonelli

[57] ABSTRACT

In automated systems such as press lines or related systems, a control circuit is typically designed to be intrinsically safe in acting on actuators which trigger movements of the presses. The actuators and/or the power amplifiers preceding them are connected to a load voltage supply circuit. In order to prevent unplanned movements during setting-up operations, when the safety circuits are partially disabled, which movements could be caused by a failure (e.g. fusing of a semiconductor component), the actuators and/or the power amplifiers preceding them are driven by the control circuit and are connected to the load voltage supply circuit by means of control keys, which trigger planned movements, via at least one zero-voltage-protected switching element.

6 Claims, 1 Drawing Figure

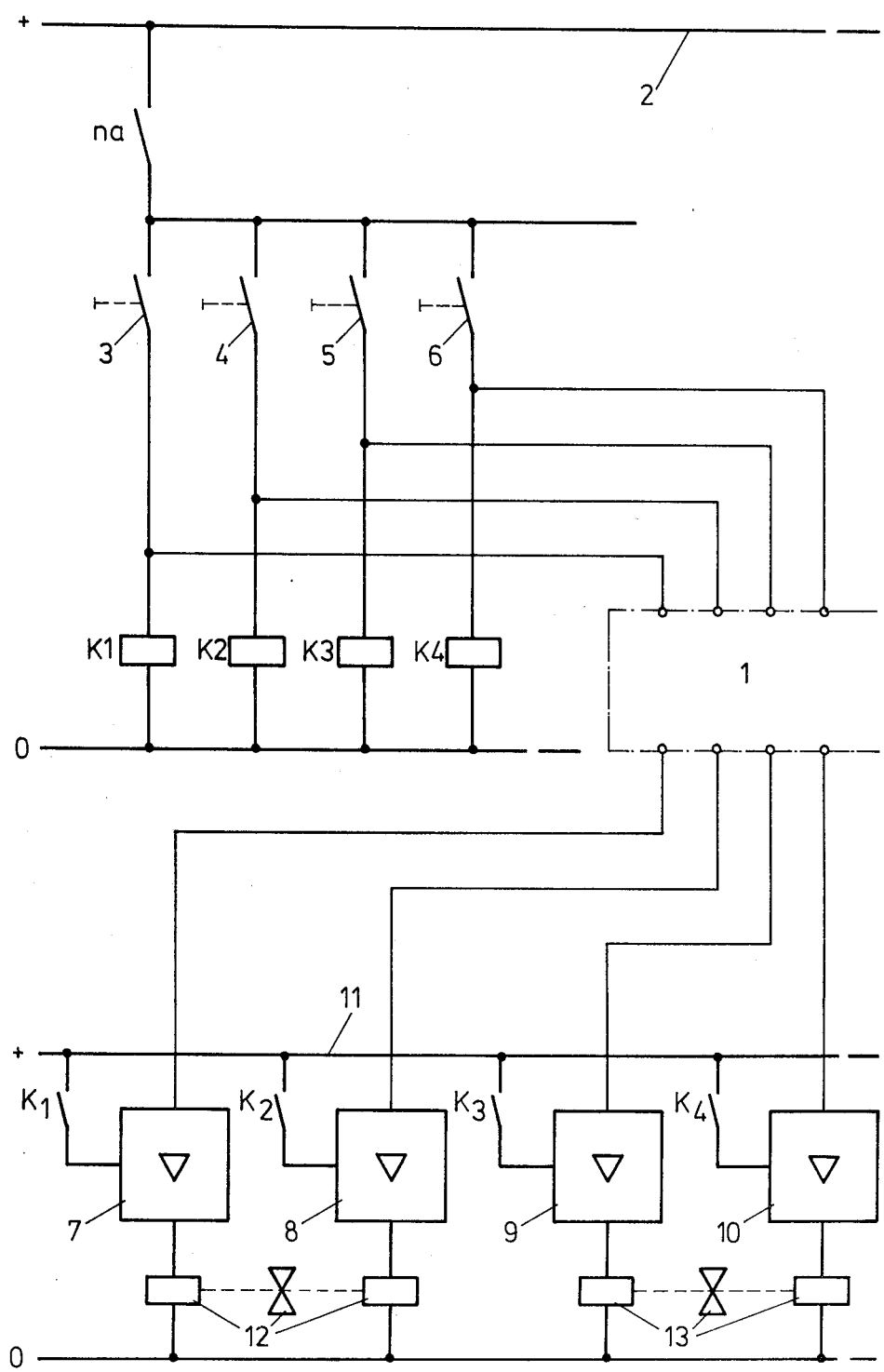

SAFETY SWITCHING DEVICE

FIELD OF THE INVENTION

The invention relates to a safety switching device for automated systems, and particularly to such systems having a control circuit constructed with electronic components, the control circuit being protected against faults and acting on actuators which trigger the movements of, in particular, presses, punching presses, automated systems and the like, with the actuators and/or the power amplifiers preceding the actuators being connected to a load voltage supply circuit.

BACKGROUND OF THE INVENTION

Control circuits constructed with electronic components, and particularly control circuits having fault protection, have for some time been a part of the state of the art and are used, for example, for controlling presses, punching presses, automated systems and the like. These control circuits pick up fault conditions by using self-monitoring logic circuits, for example, two-channel logic circuits with antivalence monitoring (see German Offenlegungsschrift 27 21 270), or by cyclic monitoring of safety-related components (see German Offenlegungsschrift 26 33 322 or British Pat. No. 1,527,857). Such control circuits are designed for monitoring certain operational conditions such as single-stroke operation with eccentric presses, and in this they guarantee a high degree of operational reliability.

The actuators ad/or the power amplifiers preceding the presses, which actuators and/or power amplifiers are driven by the control circuits, are predominantly provided with semiconductor components. These semiconductor components can be connected to a load voltage supply circuit in such a manner that, if the control circuits arnd the machines to be controlled are functioning properly, the actuators which cause movements will be driven.

In the case of a fault, however, as a rule the load volatage supply circuits are cut off. This cut-off is a result of action by the control circuit which is protected against faults. Under special operating conditions, for example, during setting-up, the control circuit can be used in such a manner that it is possible to operate the machine even though certain safety circuits (e,g, protective screen up) are deactivated. During such an operating condition the semiconductor components which switch the load voltage supply circuit are connected direactly into the active circuit. Therefore, a failure of a semiconductor component can lead to an unplanned movement, for example, in an automated system, which greatly endangers the operator during setting-up operations.

SUMMARY OF THE INVENTION

It is the object of the invention to eliminate this disadvantage and to provide the control circuit constructed with electronic components with a safety switching device which reliably prevents unplanned movements of presses, punching presses, automated systems and the like under operating conditions in which safety circuits of the control circuit have been deactivated.

These and other objects are achieved in that the actuators, and/or the power amplifiers preceding them, are connected to the load voltage supply circuit by means of control keys, which trigger planned movements, via at least one zero-voltage-protected switching element, and are driven by the control circuit.

An advantage of the safety switching device according to the invention is that only intentionally-generated movements are possible. This results in optimum protection for the operator.

BRIEF DESCRIPTION OF THE DRAWINGS

An illustrative embodiment of the invention is shown with the aid of the sole drawing, which shows a simplified block diagram of the present invention, which will be explained in greater detail in the text which follows.

DETAILED DESCRIPTION OF THE PREFERRED EMBODIMENT

Referring now to the drawings, a portion of an automated press line control circuit 1 constructed with electronic components is shown. An example of a commercially available control circuit 1 is the PLC-2 Prgrammable Controller manufactured by the Allen-Bradley Company, and an example of an automated press line using such a control circuit arrangement can be found in U.S. Pat. No. 4,037,730 and German Offenlegungsschrift 24 17 131. The section shown in the figure represents a control line 2 for setting-up operations, which is connected via a contact "na" of an emergency-off circuit to parallel-connected control keys wherein key number 3 is for an "up" commmand, key number 4 is for a "down" command, key number 5 is for a "forward" command, and key number 6 is for a "back" command. The control keys 3, 4, 5 and 6 are each series-connected to a relay K1, K2, K3 and K4, respectively.

The control keys 3, 4, 5 and 6 directly act to activate the appropriate stages of the electronic control circuit 1. The corresponding outputs of the electronic control circuit are followed by the power amplifiers 7, 8, 9 and 10 (such as the Simatic C1 and C2 static switches manufactured by Siemens Corp.), by means of which a load voltage supply circuit 11 can be connected to the actuators 12, 13 for the desired movements. An example of actuators useful for such operations are those manufactured by Herion Corp. under Model Group P413EI-SFM and P413EI-WFM. The amplifiers 7, 8, 9 and 10 are each connected to the load volatage supply circuit 11 via the contacts $K_1$, $K_2$, $K_3$ and $K_4$ of the relays K1, K2, K3 and K4. These relays K1, K2, K3 and K4 and their corresponding contacts $K_1$, $K_2$, $K_3$ and $K_4$ represent zero-voltage-protected switching elements in that in all cases they assume their inoperative positions when no drive is applied.

In the present example, the safety switching device will function if the operating condition for "set up" is switched on. As soon as control key 3 is operated a control signal is fed to the electronic control 1. This results in the power amplifier 7 being enabled which activates the actuator 12 as soon as the relay K1, which was placed under voltage when the control key 3 was operated, has closed the contact $K_1$. It is mandatory that the instructions from the control keys 3, 4, 5 and 6 are fed to the power amplifiers 7, 8, 9 and 10 via the electronic control 1 since predetermined interlock conditions which cannot be cancelled, for example, "press in UT mode-automatic system must not be started", must remain effective. The load voltage supplied to the power amplifier 7 is now switched to the actuator 12. As soon as the control key 3 is released the control signal for the electronic circuit 1 disappears and the relay K1 drops out. This results in the power amplifier 7 being reliably cut off from the load volatage supply circuit 11 via the contact $K_1$, which now opens. The actuator 12 is deactivated and the movement is interrupted. The sequence of operations is equivalent for the control keys 4, 5 and 6.

With this safety switching device, a fault such as fusing of the power output stage in the power amplifier 7 does not result in drive being supplied to the actuator 12. Therefore, no movement is triggered in the system during such a fault which could result in operators being injured.

During continuous operation or automatic operation, the safety switching device would be bridged since during these operations the control circuit 1 alone monitors the installation and its correct operation, the protective screens are closed, and all safety circuits are activated so the risks of accidents are avoided.

The safety switching device can be suitably checked by seeing that the system can be switched on in an automatic mode only if the relays K1, K2, K3 and K4 have first dropped out.

Although particular examples have been given for certain elements such as the control circuit, the power amplifiers and the actuators, it is to be understood that other suitable devices could be used, if desired.

It is to be understood that the above-described arrangements are simply illustrative of the application of the principles of this invention. Numerous other arrangements may be readily devised by those skilled in the art which embody the principles of the invention and fall within its spirit and scope.

We claim:

1. A safety switching device for a control circuit which acts on actuators which trigger the movements of controlled elements, wherein the actuators are connected to a load voltage supply circuit, characterized in that the actuators are coupled to the control circuit and to the load voltage supply circuit by means of a zero-voltage-protected switching element, said zero-voltage-protected switching element being coupled to a control key which triggers planned movements through the actuators via said zero-voltage-protected switching element.

2. An automated system for controlling a controlled element comprising:
   a control circuit;
   one or more actuators coupled to the controlled element;
   switch means for coupling the control circuit to the actuators for supplying power from a first supply line to the actuators upon receiving a signal from the control circuit;
   a control key coupled between a second supply line and the control circuit to provide control inputs to the control circuit; and
   a zero-voltage-protecting safety arrangement for preventing operation of the actuators in the event of a fault comprising:
      a relay coupled to the control key which is activated when the control key is closed and deactivated when the control key is opened; and
      a relay contact connected between the first power supply line and the switching means for coupling the switching means to the first power supply line when the relay is activated and for decoupling the switching means from the first power supply line when the relay is deactivated so that operation of the actuators is prevented unless the control key is closed.

3. An automated press system for controlling the movement of press elements comprising:
   a control circuit;
   one or more actuators coupled to the controlled press elements;
   a switch means for coupling the control circuit to the actuators and for supplying power from a first supply line to the actuators upon receiving a signal from the control circuit;
   a control key coupled between a set-up power supply line for supplying control inputs to the control circuit during press set-up; and
   a voltage-protecting-safety arrangement for preventing operation of the actuators in the event of a fault comprising:
      a relay coupled to the control key which is activated when the control key is closed and deactivated when the control key is opened; and
      a relay contact connected between the first power supply line and the switching means for coupling the switching means to the first power supply line when the relay is activated and for decoupling the switching means from the first power supply line when the relay is deactivated so that the operation of the actuators is prevented during press set-up unless the control key is closed.

4. An automated system according to claim 2 or 3, wherein the switching means is a power amplifier.

5. An apparatus in accordance with claim 1, 2, or 3, wherein the control circuit includes electronic components and wherein the zero-voltage-protecting safety arrangement prevents operation of the actuators even in the event of failure of an electronic component in the control circuit.

6. An apparatus in accordance with claim 4, wherein the power amplifier includes electronic components and wherein the zero-voltage-protecting safety arrangement prevents operation of the actuators even in the event of failure of an electronic component in the power amplifier.

* * * * *